United States Patent [19]

Kawahara

[11] Patent Number: 4,680,580

[45] Date of Patent: Jul. 14, 1987

[54] ACTIVE MATRIX-ADDRESSED LIQUID-CRYSTAL DISPLAY DEVICE

[75] Inventor: Yukito Kawahara, Tokyo, Japan

[73] Assignee: Kabushiki Kaisha Daini Seikosha, Japan

[21] Appl. No.: 467,799

[22] Filed: Feb. 18, 1983

[30] Foreign Application Priority Data

Feb. 23, 1982 [JP] Japan .................................. 57-27588

[51] Int. Cl.⁴ .............................................. G09G 3/36
[52] U.S. Cl. .................................... 340/784; 340/719
[58] Field of Search ........................ 340/719, 718, 784

[56] References Cited

U.S. PATENT DOCUMENTS 3,275,871 9/1966 Yiotis .................................. 340/719
3,644,784 2/1972 Dickey ................................ 340/719
3,862,360 1/1975 Dill et al. ........................... 340/719
4,114,070 9/1978 Asars .................................. 340/719
4,266,223 5/1981 Frame ................................ 340/719
4,368,523 1/1983 Kawate .............................. 340/784

Primary Examiner—Marshall M. Curtis
Attorney, Agent, or Firm—Bruce L. Adams; Robert E. Burns; Emmanuel J. Lobato

[57] ABSTRACT

An active matrix-addressed liquid crystal panel comprising plural matrix picture elements is disclosed. The defects of a picture caused by a short between a row electrode and a substrate is inconspicious because each row electrode controls the picture elements belonging to the row as well as the picture elements belonging to the neighboring rows.

20 Claims, 3 Drawing Figures

ACTIVE MATRIX-ADDRESSED LIQUID-CRYSTAL DISPLAY DEVICE

BACKGROUND OF THE INVENTION

The present invention relates to an active matrix-addressed liquid-crystal display device with separate electrodes at each picture element for driving a liquid crystal. Recently an active matrix-addressed liquid-crystal display device capable of displaying complicated characters and pictures has been developed by the use of a liquid crystal driven with low power. A simple matrix voltage averaging drive system, in which a liquid crystal is driven with an effective voltage between row electrodes and column electrodes, generally gives a picture with low resolution due to a limitation of the number of scanning lines. To obtain a picture with high resolution, an active matrix-addressed drive system should be applied, in which switching transistors are provided for each picture element using a sophisticated semiconductor technique on a semiconductor substrate. In such a case however, only one or a limited number of panels can be fabricated from a silicon wafer serving as a semiconductor substrate, and this results in a high cost of production because of the low yield.

FIG. 1 shows an equivalent circuit diagram of a conventional active matrix-addressed liquid-crystal panel. To improve the resolution, the number of n and m is generally 200–250. The circuit in FIG. 1 is formed on an N-type semiconductor substrate, and MOS transistors $M_{11}$, $M_{12}$, ... $M_{mn}$ are P channel MOS transistors. When image signals or signal voltages are supplied to column electrodes $X_1$, $X_2$, ... $X_n$, a voltage $V_{SS}$ negative with respect to a substrate voltage $V_{DD}$ is applied to a row electrode $Y_1$ serving as a gate for each of the MOS transistors $M_{11}$, $M_{12}$, ... $M_{1n}$ so that the image signals are supplied to electric charge storage capacitors $C_{11}$, $C_{12}$, ... $C_{1n}$, having electrodes for driving a liquid crystal. As a result, the transistors $M_{11}$, $M_{12}$, ... $M_{1n}$, are turned on and the image signals or signal voltages are written in the capacitors $C_{11}$, $C_{12}$, ... $C_{1n}$. When the image signals are sufficiently written, the substrate voltage $V_{DD}$ is applied to the row electrode $Y_1$ to turn off the MOS transistors $M_{11}$, $M_{12}$ ... $M_{1n}$ to retain the image signals. Afterwards, new image signals are applied to the column electrodes $X_1$, $X_2$ ... $X_n$ again, and the voltage $V_{SS}$ is applied to a row electrode $Y_2$ to turn on transistors $M_{21}$, $M_{22}$, ... $M_{2n}$, and the new image signals are written in capacitors $C_{21}$, $C_{22}$, ... $C_{2n}$, corresponding to each the transistor. Repeating the above operation, the MOS transistors provided at each of the picture elements of the panel are addressed in turn, whereby the image signals are held in the electric charge storage capacitors provided in couple with the MOS transistors, and the liquid crystal is driven with the driving electrode which maintains the same electric potential.

In this construction the row electrodes $Y_1$, $Y_2$, ... $Y_m$ extend from one end of the panel to the other, the length and the area of the row electrodes being sufficiently long and large in comparison with general IC patterns. As a result there may be a short between the row electrodes and the substrate due to a pinhole in the insulator on the gate or field area. Moreover, if the breakdown voltage sufficiently drops due to junction defects at a protective diode provided at an input portion of the row electrode for preventing breakdown of the gate insulator caused by static electricity, a row electrode $Y_i$ no longer serve as a gate of the MOS transistors $M_{i1}$, $M_{i2}$, ... $M_{in}$ belonging to the row electrode $Y_i$. The above-noted defects of the gate row electrode appear clearly as a line defect in a distinctly different color from the adjacent rows. Thus the whole panel may lose its value as product by a single line defect. Therefore, almost 100% yield is required for the panel and the cost per 1 panel necessarily becomes higher because only one or more panels using the semiconductor substrate of the active matrix-addressed liquid crystal display device can be fabricated from a silicon wafer by its limited space as described before.

SUMMARY OF THE INVENTION

It is an object of the present invention to provide an active matrix-addressed liquid crystal display device which realizes a sufficiently acceptable picture without prominent disorder even if there exists a line defect of the gate row electrode.

DESCRIPTION OF THE PREFERRED EMBODIMENTS

Hereinafter the embodiments of the present invention will be described in conjunction with the drawings.

Figure 2:
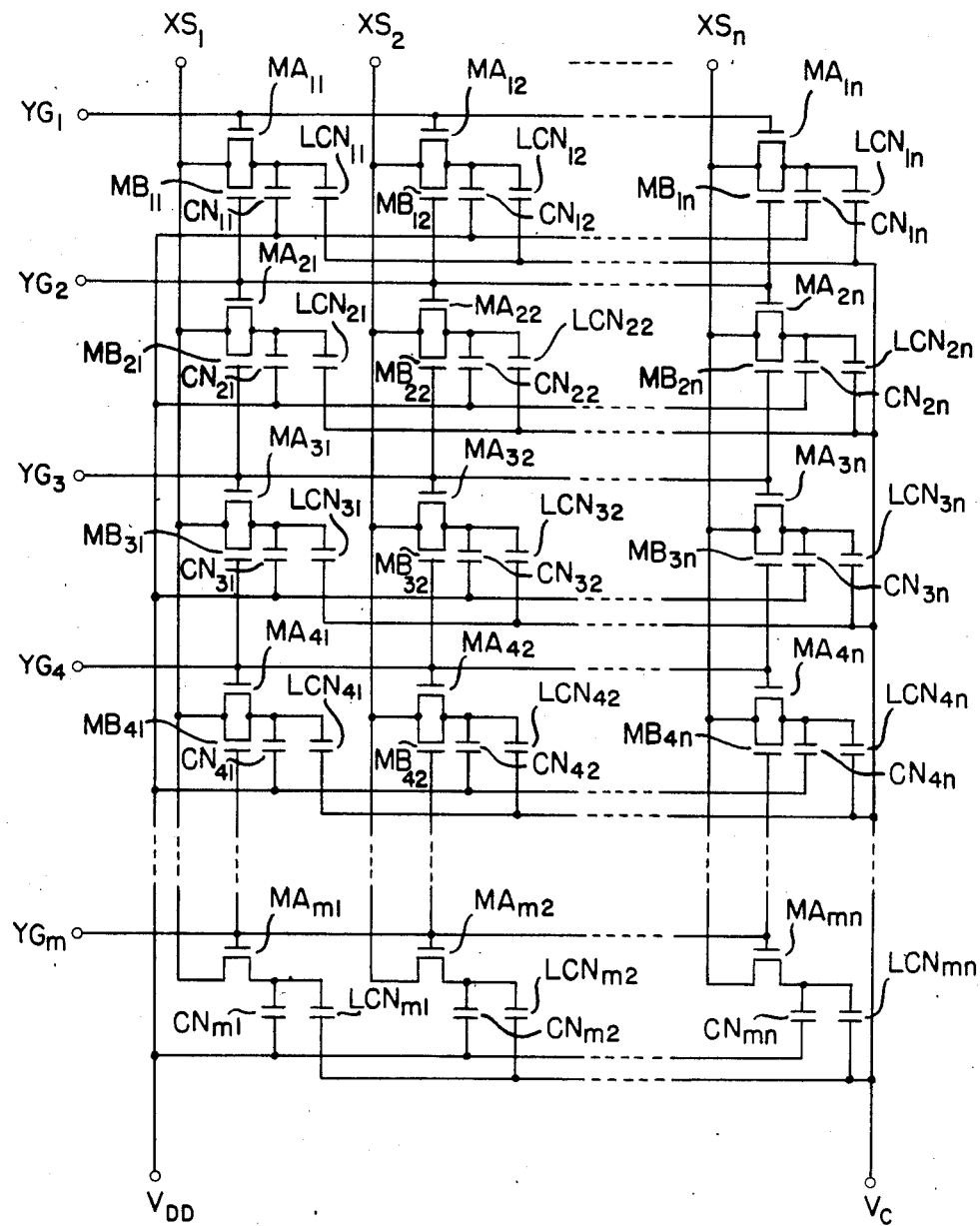
FIGS. 2 and 3 show equivalent circuit diagrams of a liquid crystal display panel of the present invention.

FIG. 2 shows an embodiment of the present invention. MOS transistors $MA_{ij}$ (where, $i=1\sim m$, $j=1\sim n$) and $MB_{ij}$ (where, $i=1\sim(m-1)$, $j=1\sim n$) are MOS transistors of the same conductivity type, which are P channel MOS transistors formed on an N-type semiconductor substrate for convenience of description.

Signal voltage storage capacitors $CN_{ij}$ ($i=1\sim m$, $j=1\sim n$) having a driving electrode which drives a liquid crystal corresponding to a unit picture element and switching elements to address them are made up of the MOS transistors $MA_{ij}$ and $MB_{ij}$. Of these, a unit liquid crystal driving cell consists of elements whose suffix ij mutually coincide. Plural LC driving cells (m×n) are arranged in an m×n or row-by-column matrix. Gate row electrodes $YG_i$ ($i=1\sim m$) for scanning the picture elements are provided to commonly use the gate electrode of the MOS transistors $MA_{ij}$ ($j=1\sim n$) belonging to the i ($i=1\sim m$) row, and the gate row electrodes $YG_i$ ($i=2\sim m$) excepting the first one $YG_1$ are connected to the MOS transistor so that they may serve as the gate electrode for MOS transistors $MB(i-1)j$ ($j=1\sim n$) included in unit LC driving cells belonging to each of the previous rows. In FIG. 2, $LCN_{ij}$ indicates the capacitors formed by the liquid crystal sandwiched between the driving electrode of the unit picture element in the i row j column and the transparent electrode. Correspondingly the sources of the MOS transistors belonging to each column are connected to be commonly used for each column, and the column electrodes $XS_j$ ($j=1\sim m$) for supplying image signals and the suffixes coincide with the number of columns.

When image signals are applied to the column electrodes $XS_1$, $XS_2$ ..., the voltage $V_{SS}$ negative with respect to the substrate voltage $V_{DD}$ is applied to the row electrode $YG_1$ which serves as the gate of the MOS transistors $MA_{11}$, $MA_{12}$, ... $MA_{1n}$ so that the image signals are supplied respectively to signal voltage storage capacitors $CN_{11}$, $CN_{12}$, ... $CN_{1n}$ having driving electrodes. In this manner the MOS transistors $MA_{11}$, $MA_{12}$ ... $MA_{1n}$ are turned on and the image signals are written in the signal voltage storage capacitors $CN_{11}$, $CN_{12}$, ... $CN_{1n}$. When the image signals are sufficiently written the voltage $D_{DD}$ is applied to the row electrode $YG_1$, and the MOS transistors $MA_{11}$, $MA_{12}$, ... $MA_{1n}$ are turned off to retain the image signals. Afterwards new image signals are applied to the column electrodes $XS_1$, $XS_2$, ... again, and the voltage $V_{SS}$ is applied to the next row electrode $YG_2$. The MOS transistors $MA_{21}$, $MA_{22}$, ... $MA_{2n}$ for which the row electrode $YG_2$ serves as a gate, and the MOS transistors $MB_{11}$, $MB_{12}$, ... $MB_{1n}$ belonging to the previous row are turned on to write the new image signals in the signal voltage storage capacitors $CN_{21}$, $CN_{22}$, ... $CN_{2n}$ and in the capacitors $CN_{11}$, $CN_{12}$, ... $CN_{1n}$ connected to each of the transistors. When the image signals are sufficiently written, the voltage $V_{DD}$ is applied to the row electrode $YG_2$ to turn off the MOS transistors $MA_{21}$, $MA_{22}$, ..., $MA_{2n}$ and $MB_{11}$, $MB_{12}$, ..., $MB_{1n}$ and retain the written image signals. By repeating the above operation the voltage $V_{SS}$ and $V_{DD}$ are applied to the gate scanning electrodes $YG_i$ in turn to write new image signals in the signal voltage storage capacitors, and the liquid crystal is driven with the driving electrodes which are at the same electric potential as the capacitors.

When there is a short between the gate row electrode $YG_i$ in the i row and the substrate, the voltage of the gate row electrode $YG_i$ is induced to the substrate voltage $V_{DD}$ even if the voltage $V_{SS}$ is applied thereto. MOS transistors $MB(i-1)_1$, $MB(i-1)_2$, ... $MB(i-1)_n$ and $MA_{i1}$, $MA_{i2}$, ... $MA_{in}$ which use $YG_i$ as the gate are thus maintained in the OFF state, and image signals from the column electrodes $XS_1$, $XS_2$, ... $XS_n$ are not written in the signal voltage capacitors $CN(i-1)_1$, $CN(i-1)_2$, ... $CN(i-1)_n$ and $CN_{i1}$, $CN_{i2}$, ... $CN_{in}$. However, at the previous state, MOS transistors $MA(i-1)_1$, $MA(i-1)_2$, ... $MA(i-1)_n$ are turned on by the voltage $V_{SS}$ applied to the gate row electrode $YG(i-1)$ in the (i-1) row, and the image signals from the column electrodes $XS_1$, $XS_2$, ... $XS_n$ are written in the capacitors $CN(i-1)_1$, $CN(i-1)_2$, ... $CN(i-1)_n$. While MOS transistors $MB_{i1}$, $MB_{i2}$, ... $MB_{in}$ are turned on by the voltage $V_{SS}$ applied to the gate row electrode $YG(i+1)$ in the (i+1) row, and the image signals from the column electrodes $XS_1$, $XS_2$, ... $XS_n$ are written in the capacitors $CN_{i1}$, $CN_{i2}$, ... $CN_{in}$ at the following state.

Figure 1:
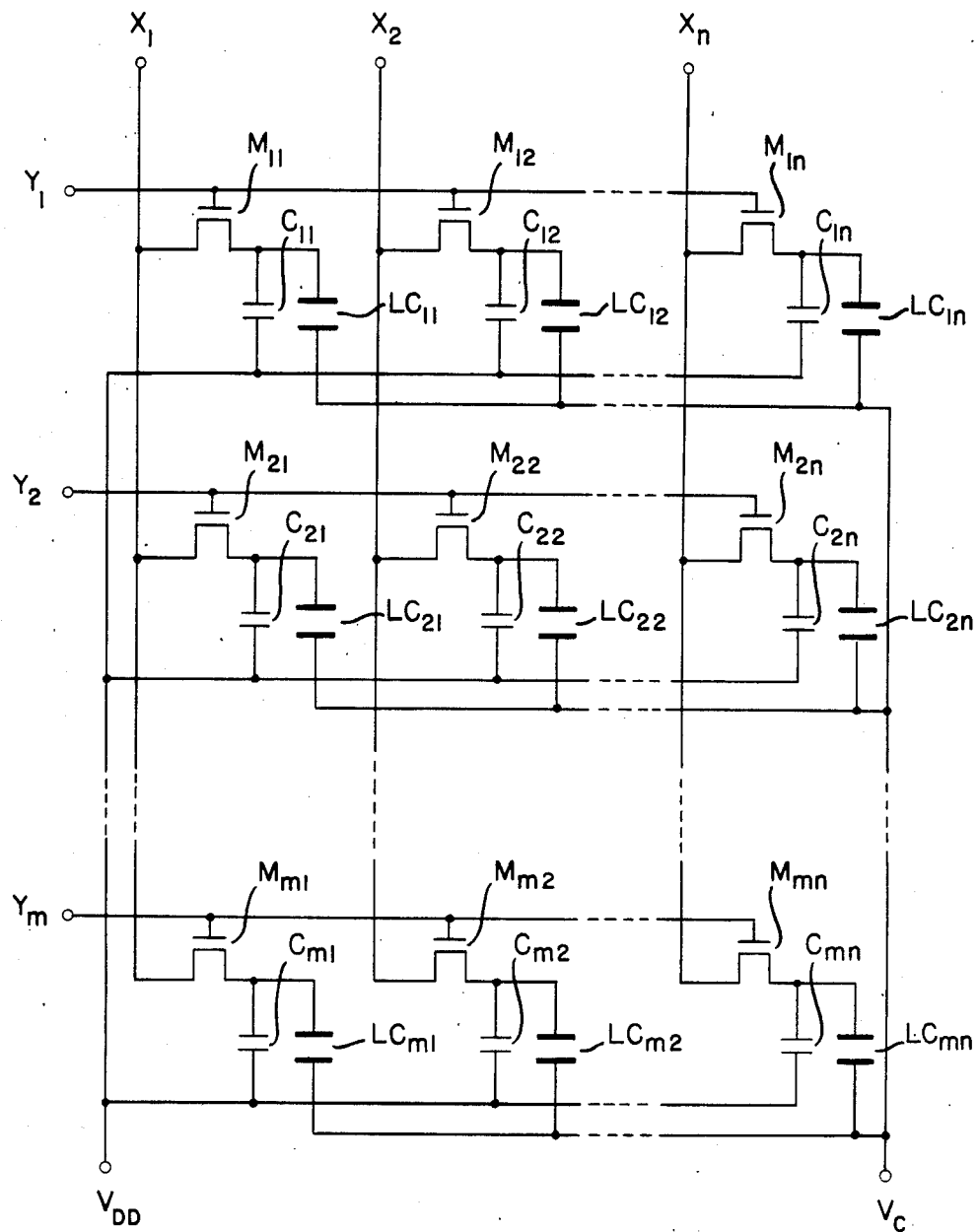
FIG. 1 shows an equivalent circuit diagram of a liquid crystal display panel of a conventional active matrix-addressed system.

In the conventional circuit construction shown in FIG. 1, when there is a short between the gate row electrode in the i row and the substrate caused by a pinhole in the insulator etc. or if the breakdown voltage is sufficiently lowered by junction defects of the protective diode provided at the substrate, the MOS transistor which use the gate row electrode as a gate is constantly in the OFF state so that image signals from the column electrodes are not written in the signal voltage storage capacitor and such appears as the line defect in the lateral direction on the picture. On the contrary, in the circuit construction shown in FIG. 2 according to the present invention, even if a MOS transistor which used the gate row electrode in the i row as a gate is constantly in the OFF state by the defect of the row electrode, an image signal supplied from a column electrode is written in a given signal voltage storage capacitor through a MOS transistor which is connected in parallel to the MOS transistor in the OFF state which uses the (i−1) or (i+1) row as a gate. Consequently, a clear line defect does not appear but the same image signals appear on the (i−2) and (i−1) rows, whereby an acceptable picture without giving an impression of disorder is obtained.

In the FIG. 2 circuit construction, although a single lateral line defect appears clearly when two successive defective gate row electrodes occur, such an event is extremely remote since the occurrence probability of the successive defective rows is extremely low in comparison with that of a single defective gate row electrode.

Figure 3:
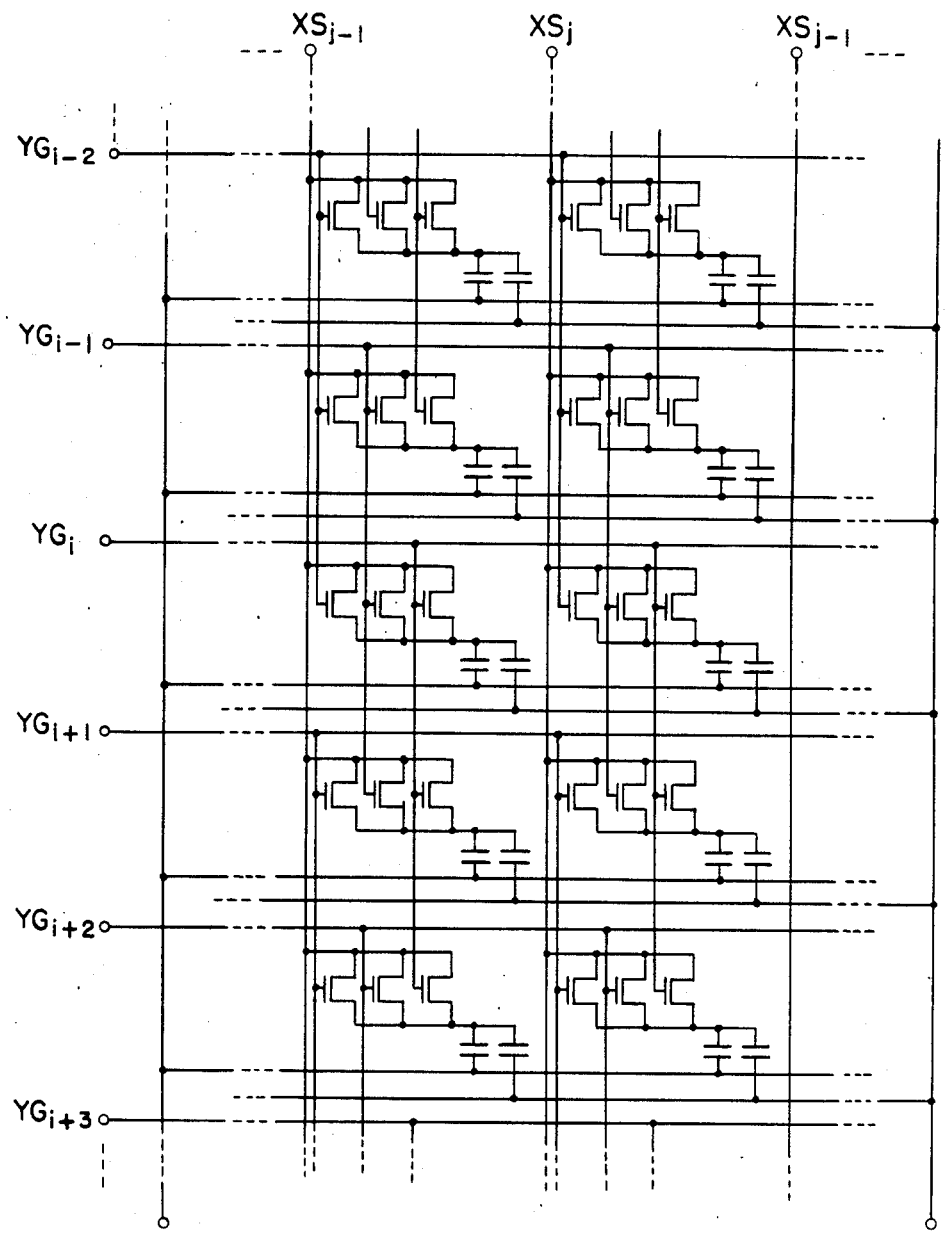

FIG. 3 shows an equivalent circuit diagram of an active matrix-addressed liquid crystal display panel according to another embodiment of the present invention, in which image signals, the same as that written in the previous or latter row to the two successive defective gate row electrodes, are written in the signal voltage storage capacitor. Since an image signal is not written in the signal voltage storage capacitor in the final row when the final gate row electrode is defective in FIG. 2, a picture in the final row does not appear. This line defect does not matter since the picture is not interrupted intermediate its ends and the uppermost and lowermost rows and the leftmost and rightmost columns are covered with a frame when mounted as the picture display device.

Although the present invention has been illustrated by way of the circuit constructed by P-channel MOS transistors formed on an N type-substrate, it is to be noted that the circuit may also be constructed by N-channel MOS transistors formed on a P type-substrate. Although MOS transistors are formed on a surface of a single crystal semiconductor substrate in the present invention, it is to be noted that the MOS transistors can also be formed on a SOS (silicon on sapphire) substrate. The present invention may be applied to TFT (thin film transistor) made of amorphous semiconductor or polycrystalline semiconductor on a quartz glass substrate.

What I claim is:

1. An active matrix-addressed liquid-crystal display device comprising: a semiconductor substrate, a transparent substrate, and a liquid crystal sandwiched between said semiconductor substrate and said transparent substrate, said semiconductor substrate comprising matrix liquid-crystal driving cells each comprised of a capacitor for holding a signal voltage to drive the liquid crystal, an electrode for driving the liquid crystal corresponding to a unit picture element, and a switching element having a gate for addressing each of the picture elements, column electrodes to apply a signal voltage for driving the liquid crystal, and row electrodes for scanning the gates to address said switching elements, wherein said switching elements belonging to some of the rows comprise MOS transistors connected in parallel to different row electrodes.

2. An active matrix-addressed liquid-crystal display device as claimed in claim 1, wherein the MOS transistors which comprise said switching elements are of the same conductivity type.

3. An active matrix-addressed liquid-crystal display device as claimed in claim 1, wherein each of the row electrodes, except for the first or the last one, addresses the switching elements extending over two or more rows of said matrix switching elements.

4. An active matrix-addressed liquid-crystal display device as claimed in claim 1, wherein the switching elements addressed by each of the row electrodes for scanning the gates, except for the electrode in the first or last row, belong to two or more neighboring rows.

5. An active matrix-addressed liquid crystal display device as claimed in claim 1, wherein said switching element corresponding to the liquid crystal driving electrode belonging to the first or last row comprises a MOS transistor and said switching element belonging to the rows except for the first or last row comprises two or more MOS transistors connected in parallel to different row electrodes.

6. An active matrix-addressed liquid crystal display device comprising: a semiconductor substrate; a transparent substrate spaced from the semiconductor substrate; liquid crystal material sandwiched between the semiconductor and transparent substrates; a matrix of liquid crystal cells formed on the semiconductor substrate in a row-by-column matrix, each cell comprising a driving electrode for driving a region of the liquid crystal material corresponding to a unit picture element, a capacitor for holding a signal voltage to be applied to the driving electrode, and a MOS transistor having a gate for addressing the picture element to enable a signal voltage to be applied to the capacitor; column electrodes for applying signal voltages to the columns of MOS transistors; row electrodes for applying a scanning voltage to the gates of the rows of MOS transistors; and means operative, when one of the row electrodes is ineffective to apply the scanning voltage to a given row of MOS transistors, for applying to the capacitors in that given row the same signal voltages as applied to the capacitors in a neighboring row.

7. An active matrix-addressed liquid crystal display device according to claim 6; wherein said means comprises at least two MOS transistors for each liquid crystal cell in a majority of the rows of cells, the at least two MOS transistors being connected in parallel to different row electrodes.

8. An active matrix-addressed liquid crystal display device according to claim 7; wherein said at least two MOS transistors comprises three MOS transistors.

9. An active matrix-addressed liquid crystal display device according to claim 8; wherein the liquid crystal cells in all of the rows of cells except at least one of the first and last rows have three MOS transistors connected in parallel to different row electrodes.

10. An active matrix-addressed liquid crystal display device according to claim 9; wherein all of the MOS transistors are of the same conductivity type.

11. An active matrix-addressed liquid crystal display device according to claim 7; wherein the liquid crystal cells in all of the rows of cells except at least one of the first and last rows have two MOS transistors connected in parallel to different row electrodes.

12. An active matrix-addressed liquid crystal device according to claim 11; wherein all of the MOS transistors are of the same conductivity type.

13. An active matrix-addressed liquid crystal device according to claim 7; wherein the at least two MOS transistors have their gates connected to different row electrodes.

14. An active matrix-addressed liquid crystal display device comprising: a semiconductor substrate; a transparent substrate spaced from the semiconductor substrate; liquid crystal material sandwiched between the semiconductor and transparent substrates; a matrix of liquid crystal cells formed on the semiconductor substrate in a row-by-column matrix, each cell comprising a driving electrode for driving a region of the liquid crystal material corresponding to a unit picture element, a capacitor for holding a signal voltage to be applied to the driving electrode, and a MOS transistor having a gate for addressing the picture element to enable a signal voltage to be applied to the capacitor; column electrodes for applying signal voltages to the columns of MOS transistors; row electrodes for applying a scanning voltage to the gates of the rows of MOS transistors; and means for applying to a given row electrode of a given row of picture elements the same scanning voltage as applied to a neighboring row electrode of a neighboring row of picture elements in the event that given row electrode becomes inoperative thereby preventing the occurrence of a blank row of picture elements in the displayed picture.

15. An active matrix-addressed liquid crystal display device according to claim 14; wherein said means comprises at least two MOS transistors for each liquid crystal cell in a majority of the rows of cells, the at least two MOS transistors being connected in parallel to different row electrodes.

16. An active matrix-addressed liquid crystal display device according to claim 15; wherein the liquid crystal cells in all of the rows of cells except at least one of the first and last rows have three MOS transistors connected in parallel to different row electrodes.

17. An active matrix-addressed liquid crystal display device according to claim 16; wherein all of the MOS transistors are of the same conductivity type.

18. An active matrix-addressed liquid crystal display device according to claim 15; wherein the liquid crystal cells in all of the rows of cells except at least one of the first and last rows have two MOS transistors connected in parallel to different row electrodes.

19. An active matrix-addressed liquid crystal display device according to claim 18; wherein all of the MOS transistors are of the same conductivity type.

20. An active matrix-addressed liquid crystal display device according to claim 15; wherein the at least two MOS transistors have their gates connected to different row electrodes.

* * * * *